United States Patent
Tani et al.

(10) Patent No.: US 9,681,075 B2
(45) Date of Patent: Jun. 13, 2017

(54) METHOD AND APPARATUS FOR FAULT DETECTION FOR IMAGER DECODER

(71) Applicant: Omron Corporation, Kyoto (JP)

(72) Inventors: Yoshiharu Tani, Kusatsu (JP); John Drinkard, Foster City, CA (US)

(73) Assignee: OMRON CORPORATION, Kyoto (JP)

( * ) Notice: Subject to any disclaimer, the term of this patent is extended or adjusted under 35 U.S.C. 154(b) by 111 days.

(21) Appl. No.: 14/627,630

(22) Filed: Feb. 20, 2015

(65) Prior Publication Data

US 2015/0244952 A1 Aug. 27, 2015

Related U.S. Application Data

(60) Provisional application No. 61/944,919, filed on Feb. 26, 2014.

(51) Int. Cl.
*H04N 5/365* (2011.01)
*H04N 17/00* (2006.01)

(52) U.S. Cl.
CPC ......... *H04N 5/3658* (2013.01); *H04N 17/002* (2013.01)

(58) Field of Classification Search
CPC ...................................... H04N 5/363
See application file for complete search history.

(56) References Cited

U.S. PATENT DOCUMENTS

| | | | |
|---|---|---|---|
| 5,452,338 A * | 9/1995 | Granfors | H04N 5/32 348/E5.081 |
| 6,903,769 B1 | 6/2005 | Wang et al. | |
| 7,480,006 B1 | 1/2009 | Frank | |
| 2004/0051797 A1 * | 3/2004 | Kelly | H04N 5/361 348/244 |
| 2005/0036045 A1 | 2/2005 | Fuchs et al. | |
| 2005/0068431 A1 * | 3/2005 | Mori | H04N 5/365 348/241 |
| 2005/0242380 A1 * | 11/2005 | Suzuki | H04N 5/32 257/292 |
| 2007/0258001 A1 | 11/2007 | Stanco et al. | |
| 2010/0091137 A1 | 4/2010 | Schnaithmann | |
| 2011/0285857 A1 | 11/2011 | He | |
| 2013/0027574 A1 | 1/2013 | Solhusvik | |
| 2013/0293724 A1 | 11/2013 | Martinussen | |

* cited by examiner

*Primary Examiner* — Nelson D. Hernández Hernández
(74) *Attorney, Agent, or Firm* — Murphy, Bilak & Homiller, PLLC

(57) ABSTRACT

The teachings herein provide a method and apparatus for detecting erroneous pixel addressing in an imaging sensor. The method and apparatus advantageously leverage the characteristic "fixed pattern noise" of the sensor to detect addressing errors. Broadly, pixel addressing errors are detected based on comparing the pattern noise seen in data read outs from a targeted address of the sensor with characteristic fixed pattern noise known for the sensor.

11 Claims, 12 Drawing Sheets

| SAFETY CRITICAL OUTPUT SIGNAL | FAILURE MECHANISM | SAFETY IMPACTS OF A SYSTEM USING IMAGERS | MITIGATION |
|---|---|---|---|
| ROW/COLUMN SELECTION SIGNAL THIS SIGNAL SELECTS THE TARGETED ROW FOR IMAGE READOUT. THIS SIGNAL IS CRITICAL FOR PROPER ADDRESSING | WRONG ROW/COLUMN SELECTED | LOSS OR DETERIORATION OF DETECTION CAPABILITY | ROW/COLUMN DECODER TEST |

*FIG. 4*

| FALSE POSITIVE RISK | POTENTIAL CAUSE | ANALYSIS | COUNTERMEASURE |
|---|---|---|---|
| LOSS OF UNIQUENESS OF EACH COLUMNWISE AND/OR ROW-WISE FPN PATTERN | LOW TEMPERATURE | FPN PATTERNS LARGELY DEPEND ON TEMPERATURES. AT A LOWER TEMPERATURE THE STRENGTH OF A FPN PATTERN DECREASES AND MAY LOOSE UNIQUENESS OF EACH PATTERN, WHICH RESULTS IN LOSS OF THE ABILITY OF THE MITIGATION TECHNIQUE TO DISTINGUISH BETWEEN ROWS IN THE PIXEL ARRAY. | HEAT THE SENSOR, E.G., BY INCLUDING AN ELECTRIC HEATER, OR BY USING HEAT NORMALLY GENERATED IN THE DEVICE OR EQUIPMENT HOUSING THE SENSOR. |
| | | | CORRELATION PROCESSING DECLARES ADDRESSING ERROR IF STRONGEST CORRELATION RESULTS ARE NOT SEEN W.R.T. TARGETED ROW OR COLUMN; HIGH CORRELATIONS W.R.T. MULTIPLE ROWS/COLUMNS IS ALSO TAKEN AS AN ERROR |
| | STRONG SCENE LIGHTS | IF STRONG LIGHT SOURCES EXIST IN THE MONITORED SCENE, THEY COULD CORRUPT FPN PATTERNS. | USING A FILTERING ALGORITHM. |

FIG. 9

| TEMPERATURE OF THERMOSTATIC BATH [°C] | EXAMPLE SENSOR TEMPERATURE [°C] | ANTICIPATED IMAGER TEMPERATURE IN THE ACTUAL PRODUCT [°C] |
|---|---|---|
| 0 | 13 | 25 |
| 5 | 18 | 30 |
| 10 | 23 | 35 |
| 15 | 28 | 40 |
| 20 | 33 | 45 |
| 25 | 37 | 50 |
| 30 | 42 | 55 |
| 35 | 48 | 60 |
| 40 | 53 | 65 |
| 45 | 58 | 70 |
| 50 | 62 | 75 |

*FIG. 10*

```
// row-wise correlation check
NUM_COLUMN=36          // 36 for power-on, 752+36 for run-time
NUM_ROW=480
float sum_x, sum_xx, sum_y, sum_yy, sum_xy;
float Correlation{NUM_ROW};
float Factory_FPN{NUM_ROW*NUM_COLUMN};   // factory provided
temperature-dependent FPN
float Runtime_FPN{NUM_ROW*NUM_COLUMN};   // current FPN
average 10-30 LITF images into Runtime_FPN{NUM_ROW*NUM_COLUMN};
// calculate ROW correlation coefficients
// sum_x, sum_xx shall be pre-calculated to same time.
for (row_x-1 to NUM_ROW) {                    // factory FPN
   for(row_y-1 to NUM_ROW) {           // current FPN
        for(column-1 to NUM_COLUMN) {
            sum_x   +=Factory_FPN(row_x, column);
            sum_xx  +=Factory_FPN(row_x, column)*Factory_FPN(row_x, column);
            sum_y   +=Runtime_FPN(row_y, column);
            sum_yy  +=Runtime_FPN(row_y, column)*Runtime_FPN(row_y, column);
            sum_xy  +=Runtime_FPN(row_y, column)*Factory_FPN(row_x, column);
        }
        Correlation(row_y) = (NUM_COLUMN*sum_xy - sum_x*sum_y) / \
                    ( (sqr(NUM_COLUMN*sum_xx) - sum_x*sum_x) *
                      (sqr(NUM_COLUMN*sum_yy) -sum_y*sum_y) );
   } for (row-1 to NUM_ROW) {
        search peak value in Correlation(row), get its peak_position
   } if (peak_position == row_x)
        row_x mitigation PASS;
   else
        row_x mitigation FAIL;
}
```

*FIG. 11*

| | AT POWER ON | AT RUN TIME |
|---|---|---|
| IMAGER TEMPERATURE | IMAGER IS NOT HOT. DIFFICULT TO SET A REQUIREMENT | IMAGER CAN BE HOT ENOUGH. E.G., 40°C |
| MAXIMUM ALLOWABLE EXPOSURE TIME REQUIREMENT | NO LIMIT TO THE MAX EXPOSURE TIME. | TYPICALLY, A FRAME PERIOD. |
| TEST PATTERN (1) : FPN • FPN IS TEMPERATURE-DEPENDENT. HOWEVER, ITS TEMPERATURE CHARACTERISTICS CAN BE NICELY PREDICTABLE AT FACTORY CALIBRATION AND PARAMETRIC REPRESENTATIONS CAN BE STORED IN A MEMORY | - EACH COLUMN AND/OR ROW OF DARK PIXELS (IN THE DARK COLUMNS AND/OR ROWS)<br>- HUNDREDS OF ms TO A FEW SECONDS EXPOSURE TIME<br>- INTEGRATE MORE THAN 10 FRAMES<br>**ONLY A FEW PIXELS FOR EACH COLUMN OR ROW FOR THE FPN ANALYSIS DOESN'T SEEM TO BE SUFFICIENT TO DISTINGUISH EACH FPN PATTERN. HOWEVER, IF FPN STANDS OUT, TYPICAL PIXEL INTENSITY IS RANDOMLY RANGED FROM 10 TO AROUND 100 LSBs DEPENDING ON DARK CURRENT LEVELS. THE PROBABILITY THAT A SET OF E.G., THREE PIXELS FOR A CERTAIN COLUMN COINCIDES WITH ANOTHER SET FOR A DIFFERENT COLUMN WOULD BE ROUGHLY ESTIMATED AS $1/90)^3$, 1.37e-6 WHICH IS VERY SMALL. IN FACT, BASED ON THE INITIAL ANALYSIS OF SEVERAL FPN PATTERNS, ONLY ABOUT 10 SETS OF THREE PIXELS COINCIDE WITH ANOTHER SET. IF EACH ROW OR COLUMN CONTAINS MORE AND MORE PIXELS, THE ABILITY TO DISTINGUISH EACH FPN PATTERN IS IMPROVED. | - EACH COLUMN AND/OR ROW OF AN ACTIVE PIXEL ARRAY<br>- LOW EXPOSURE TIME<br>- INTEGRATE MORE THAN 10 FRAMES |
| CONTROLLABLE FUNCTION (1) : ANALOG OFFSET | -APPLICABLE<br>- CONTROLLABLE 127 LSB VARIABLE STEPS COULD INDUCE 0~30 LSB OFFSET OF PIXEL INTENSITY, FOR EX. | -APPLICABLE<br>- CONTROLLABLE 127 LSB VARIABLE STEPS COULD INDUCE 0~30 LSB OFFSET OF PIXEL INTENSITY, FOR EX. |
| CONTROLLABLE FUNCTION (2) : ANALOG GAIN | -APPLICABLE<br>- GAIN IS CONTROLLABLE E.G., FROM x1 TO x4 WHICH MAY HELP TO LET FPN PATTERNS STAND OUT | -APPLICABLE<br>- GAIN IS CONTROLLABLE E.G., FROM x1 TO x4 WHICH MAY HELP TO LET FPN PATTERNS STAND OUT |
| CONTROLLABLE FUNCTION (3) : ADC RESOLUTION CONTROL (INCREASED ADC RESOLUTION) | -APPLICABLE<br>- MAY HELP TO LET FPN PATTERNS STAND OUT THANKS TO FINER RESOLUTIONS OF E.G., FROM 10-BIT TO 12-BIT. | -APPLICABLE<br>- MAY HELP TO LET FPN PATTERNS STAND OUT THANKS TO FINER RESOLUTIONS OF E.G., FROM 10-BIT TO 12-BIT. |
| CONTROLLABLE FUNCTION (4) : ADC REFERENCE VOLTAGE CONTROL | -APPLICABLE<br>- MAX GAIN IS E.G., x1.4 WHICH MAY HELP TO LET FPN PATTERNS STAND OUT. | -APPLICABLE<br>- MAX GAIN IS E.G., x1.4 WHICH MAY HELP TO LET FPN PATTERNS STAND OUT. |

*FIG. 12*

METHOD AND APPARATUS FOR FAULT DETECTION FOR IMAGER DECODER

RELATED APPLICATIONS

This application claims priority under 35 U.S.C. 119(e) from the provisional patent application filed in the United States Patent and Trademark Office on 26 Feb. 2014 and assigned Application No. 61/944,919, which application is incorporated herein by reference.

TECHNICAL FIELD

The present invention generally relates to imagers, such as CMOS image sensors used in cameras, and particularly relates to detecting faults associated with imager decoding.

BACKGROUND

FIG. 1 illustrates an example CMOS image sensor and although these details are useful for understanding the teachings herein, they should be understood as non-limiting. The illustrated CMOS image sensor 10, where "CMOS" denotes Complementary Metal Oxide Semiconductor. The sensor 10 includes cover glass and a micro-lens array 12, an active pixel sensor array 14, along with associated analog processing circuitry 16, an analog-to-digital converter or ADC 18, and digital signal processing circuitry 20 which operates on the analog data converted into digital form by the ADC 18.

The sensor 10 further includes processing and interface circuitry 22, for interfacing with one or more elements of the sensor 10, such as the digital processing circuitry 20. Still further, the sensor 10 includes a control register 24, for controlling certain operations, such as the operation of exposure timing and control circuitry 26 and image readout timing and control circuitry 28. In turn, that circuitry controls a row decoder circuit 30 and a column decoder circuit 32, which are used to read-out data from the active pixel array 14.

By activating one row at a time of the active pixel array 14 with the row decoder circuit 30, the active pixel sensor array 14 outputs analog signals representing pixel data for the selected row. The analog processing circuitry 16 includes sample-and-hold circuits for capturing the analog pixel data. After any analog processing, the captured analog data is converted into the digital domain by the ADC 18 and further processed in the digital processing circuitry 20.

FIG. 2 illustrates an example "floor plan" applicable to the example sensor 10 shown in FIG. 1. A counter in the timing and control circuit 28 implements automatic scans of the pixel array 14. In more detail, the counter generates the address signals to the row and column decoder circuits 30 and 32. This scheme allows independent addressing of each pixel in the active pixel array 14.

FIG. 3 provides example pixel circuit details, for the pixel circuits comprising the active pixel array 14 shown in FIGS. 1 and 2. FIG. 3 illustrates the row/column readout scheme implemented in the active pixel array 14 of the sensor. In particular, one sees transistors Q1 and Q2 associated with row/column activation, and transistors Q3 and Q4 providing storage and saturation control, respectively.

Certain failures among the various types of failures associated with sensors of the type illustrated in the examples of FIGS. 1-3 are particularly problematic, in terms of their effect on operation, or their difficulty of detection, or both. For example, addressing errors are particularly problematic. In more detail, if either the row decoding or column decoding fails in such a way as to cause addressing errors, then the data read out for selected pixels may in fact represent data for non-selected pixels in a different row or column of the active pixel array 14.

Beyond merely causing artifacts or corruption of the image data being read out from the sensor, it is recognized herein that sensor addressing errors represent a significant safety-of-design consideration in applications where the sensor 10 is used for machine guarding, autonomous vehicle guidance, area monitoring, or other high-security and/or safety-critical imaging functions. For example, in safety-critical machine vision or other object-detection applications, faulty sensor addressing may cause the imaging system to miss objects that would otherwise have been detected.

Various known approaches for detecting sensor-addressing errors include injecting test patterns or images into the sensor. These injected patterns or images may be built-in or external. In either case, the image data read from the involved sensor should match the injected test pattern or image. Unfortunately, the use of test patterns represents a potentially lengthy type of verification testing and their use generally requires taking the sensor offline—e.g., suspending its normal or nominal imaging operations for test pattern injection.

Another approach involves attaching a kind of data or mark representing the address of each pixel. The attachment is done when the pixel signals are read out from the involved pixel array. However, this approach to addressing-error detections requires that the sensor be specially designed, and such sensors tend to be more expensive than low cost general-purpose CMOS imaging sensors.

SUMMARY

The teachings herein provide a method and apparatus for detecting erroneous pixel addressing in an imaging sensor. The method and apparatus advantageously leverage the characteristic "fixed pattern noise" of the sensor to detect addressing errors. Broadly, pixel addressing errors are detected based on comparing the pattern noise seen in data read outs from a targeted address of the sensor with characteristic fixed pattern noise known for the sensor.

In an example embodiment, a method of detecting erroneous pixel addressing in an image sensor comprising a pixel array includes obtaining actual fixed pattern noise for targeted pixel addresses of the image sensor and correlating the actual fixed pattern noise with reference fixed pattern noise known for the targeted pixel addresses. The method further includes detecting an addressing fault for the image sensor based on the correlation results.

In another embodiment, a test circuit configured to detect addressing errors in an image sensor includes a processing circuit, and a computer-readable medium storing a fixed pattern noise, FPN, template. The template includes reference FPN values for at least a range of pixel addresses of the sensor, and the test circuit further includes a sensor interface circuit configured to communicatively couple the processing circuit to the image sensor.

Correspondingly, the processing circuit is configured to obtain actual fixed pattern noise for targeted pixel addresses of the image sensor, and to correlate the actual fixed pattern noise with reference fixed pattern noise known for the targeted pixel addresses. The processing circuit is further configured to detect an addressing fault for the image sensor based on the correlation results.

In another embodiment, a method of detecting erroneous pixel addressing in an image sensor includes reading actual fixed pattern noise, FPN, values from targeted pixel addresses of the image sensor and determining whether the actual FPN values match reference FPN values that are characteristic of the pixels actually at the targeted pixel addresses. The method further includes deciding that an addressing fault exists for the image sensor if the actual FPN values do not match the reference FPN values for the targeted pixel addresses.

In a related embodiment, a test circuit is configured for detecting addressing errors in an image sensor and it includes a processing circuit and a computer-readable medium storing a fixed pattern noise, FPN, template that comprises reference FPN values for at least a range of pixel addresses of the sensor. The test circuit further includes a sensor interface circuit configured to communicatively couple the processing circuit to the image sensor, where the processing circuit is configured to read actual fixed pattern noise, FPN, values from targeted pixel addresses of the image sensor, determine whether the actual FPN values match the reference FPN values known from the FPN template for the pixels actually at the targeted pixel addresses, and decide that an addressing fault exists for the image sensor if the actual FPN values do not match the reference FPN values for the targeted pixel addresses.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 4 is a table of mitigation information, identifying key failure mechanisms for an image sensor used in a safety-critical application.

FIG. 9 is a table of further mitigation information, identifying key risks and corresponding mitigations used with respect to an image sensor in one or more embodiments disclosed herein.

FIG. 10 is a table of measured and expected temperature values for an example image sensor circuit and device.

FIG. 11 is diagram of pseudo-code according to one embodiment of image sensor testing taught herein.

FIG. 12 is a table identifying additional circuit control mechanisms that are use individually or in combination, for testing an image sensor according one or more embodiments disclosed herein.

DETAILED DESCRIPTION

Figure 1:
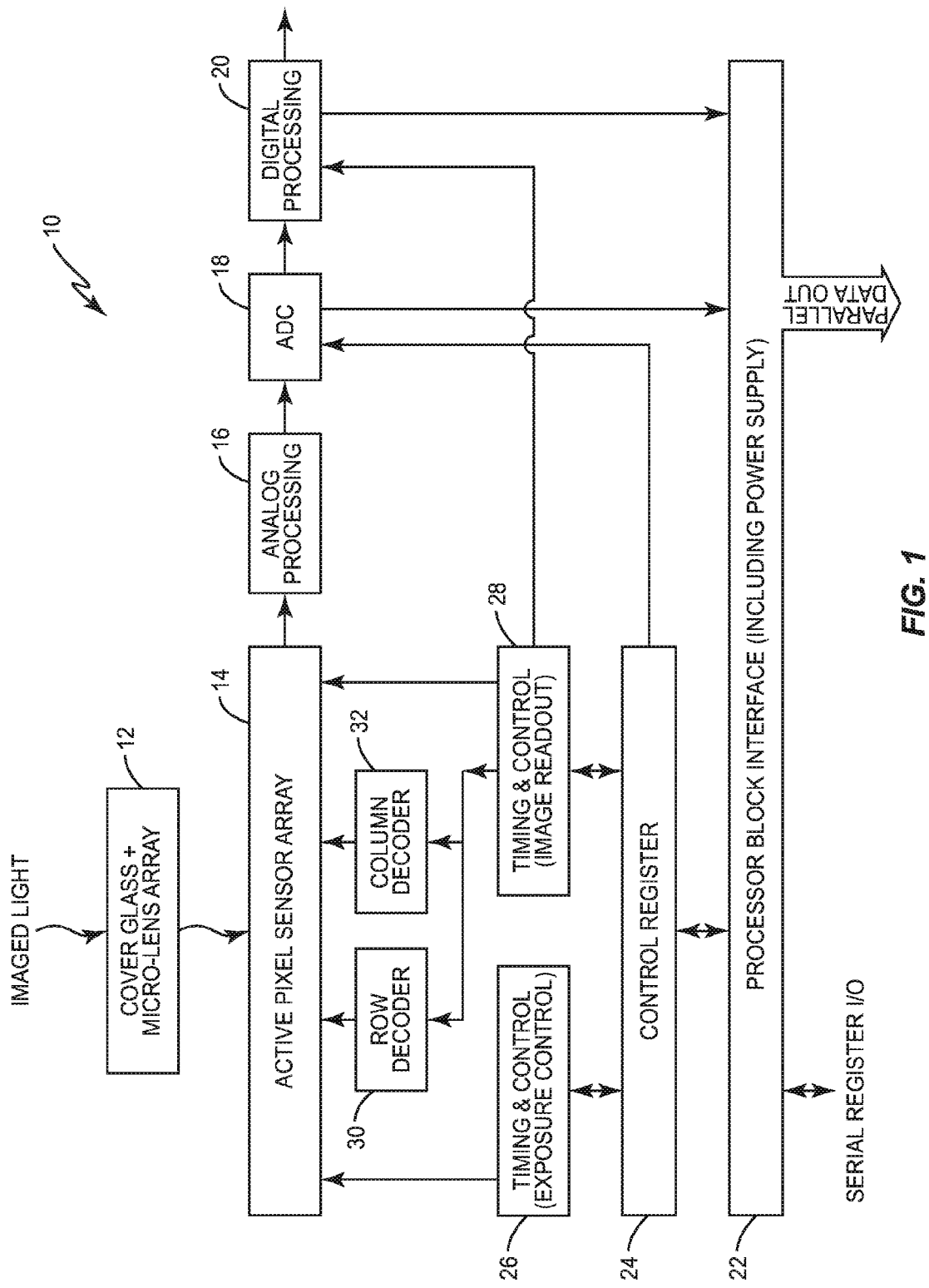
FIG. 1 is a block diagram of an example image sensor.
Figure 3:
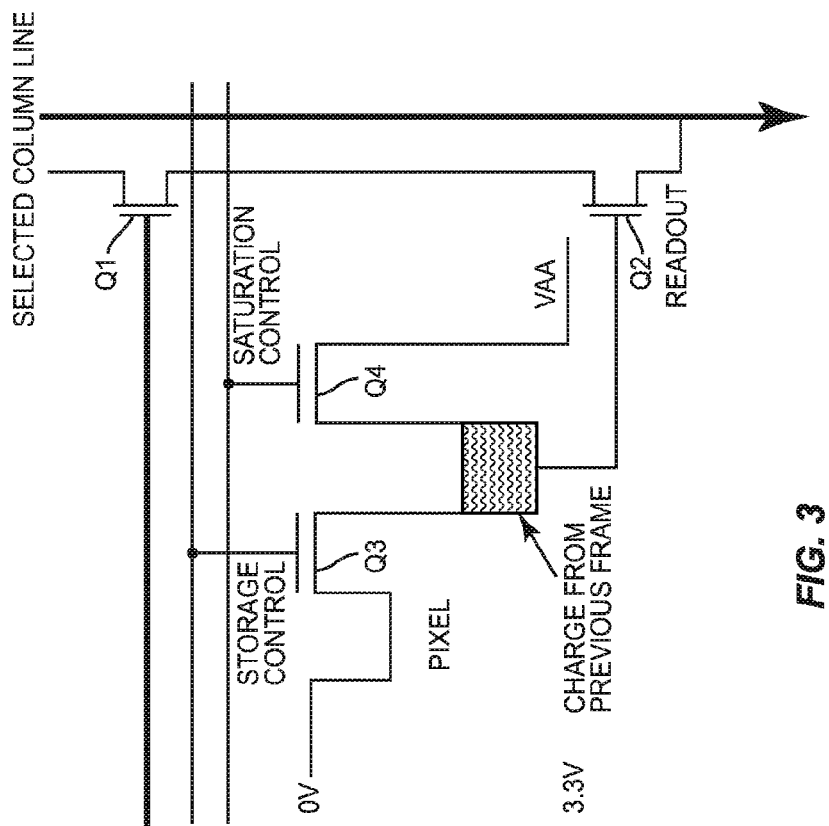
FIGS. 2 and 3 provide further circuit details for the image sensor of FIG. 1.
Figure 2:
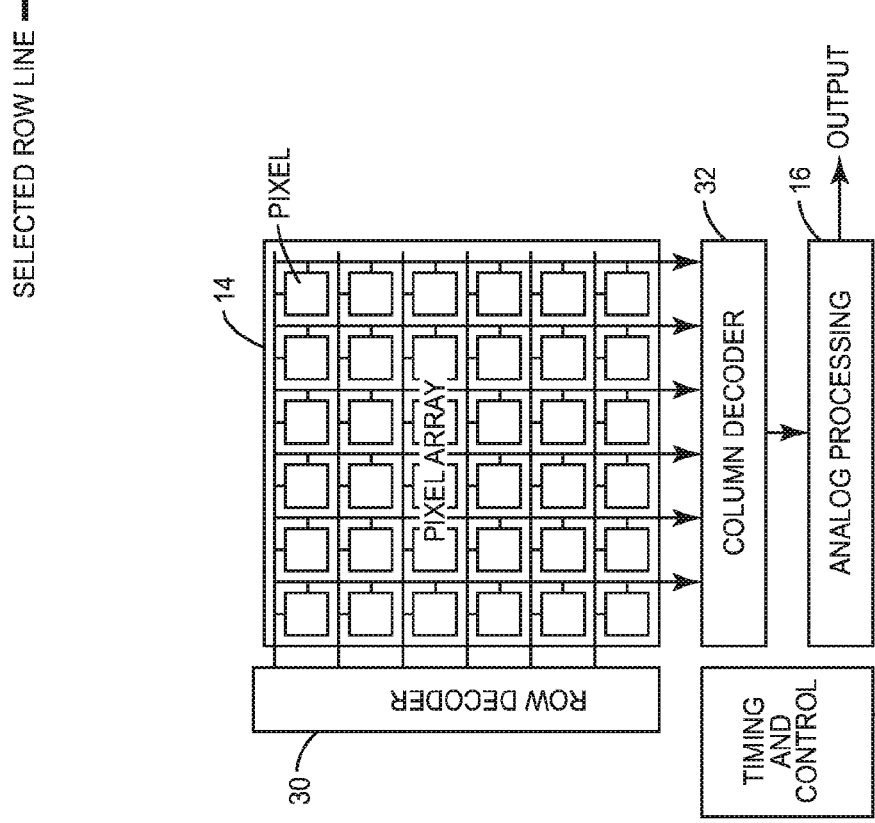

FIG. 4 illustrates a "mitigations" table that identifies the selected row/column line output or signal of an image sensor as a safety-critical output. The illustrated table identifies row/column decoding testing as a mitigation technique. Of particular interest herein, the mitigation testing disclosed herein does not require specialized sensor circuitry or features, and instead directly applies to "generic" or otherwise general-purpose imaging sensors, such as seen in the examples of FIGS. 1-3.

In one aspect of the faulty addressing detection taught herein, fault detection involves determining whether the "fixed pattern noise" or FPN read out from the pixel array at given address locations of the pixel array match a characteristic FPN known for those address locations. Here, it will be appreciated that FPN refers to the distinct and fixed pattern of intensity or brightness variations seen across pixels in an imaging array that is caused by variations in the sensitivity or responsiveness of the individual pixels and/or the associated amplification circuitry.

In general, each row or column in the pixel array of a given sensor will exhibit a characteristic FPN. Thus, to the extent that a test circuit—such as a programmed processor—knows the characteristic FPN for each row and/or column of pixels in the pixel array, it can detect that its row/column selection input to the sensor is not being correctly decoded, for one or more rows or columns of the pixel array, based on detecting that the FPN obtained for a given row/column address does not match the FPN characteristic for that given row/column address.

More broadly, it is recognized herein that every imager sensor has statistically unique FPN for the rows and columns comprising its pixel array. Thus, by attempting to read from specific addresses of the pixel array and determining whether the correspondingly output FPN is characteristic for the addresses being read, the test circuit and method taught herein detect addressing errors—also referred to as decoding errors. Non-limiting example errors detected in include swapped rows, swapped columns, etc.

Notably, FPN appears both in the active pixel array and the dark rows and columns of the pixel array. In this regard, note that the typical image sensor has "dark" row(s)/column(s). A dark row or column is optically black and insensitive to incident light. Usually, dark rows and columns surround the optically active pixel area—i.e., that area of the pixel array that is responsive to incident light—and these dark rows and columns can be addressed in the same manner as the rows and columns within the active pixel area of the pixel array.

Figure 6:
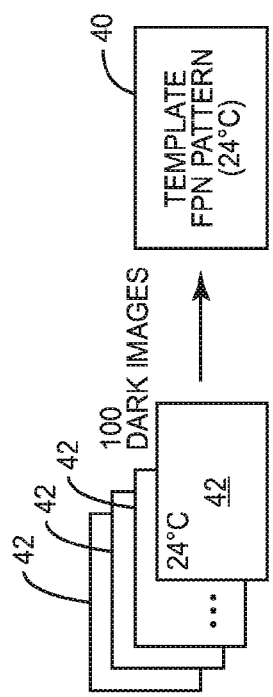
FIG. 6 is a diagram of one embodiment of a fixed noise pattern template, according to the teachings herein.
Figure 5:
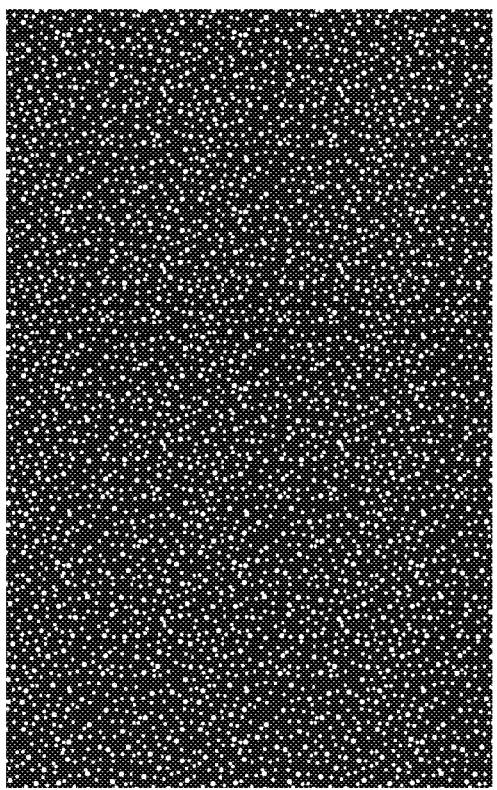
FIG. 5 is a diagram of an example fixed noise pattern for an image sensor.

FIG. 5 illustrates example FPN for the pixel array of a CMOS image sensor. Here, the rows and columns of the pixel array exhibit characteristic FPN and FIG. 6 illustrates one contemplated approach for creating a FPN "template" 40 as part of factory calibration or characterization processing for a given sensor. In the illustrated example, the FPN is characterized at 24 degrees Celsius and it is based on averaging over 100 dark images 42 to create the FPN template 40 for the sensor. It will be understood that in an example case, the FPN template 40 comprises a file, data record or other electronic data comprising FPN values corresponding to at least some of the row/columns of the sensor—e.g., the dark rows and columns.

Figure 7:
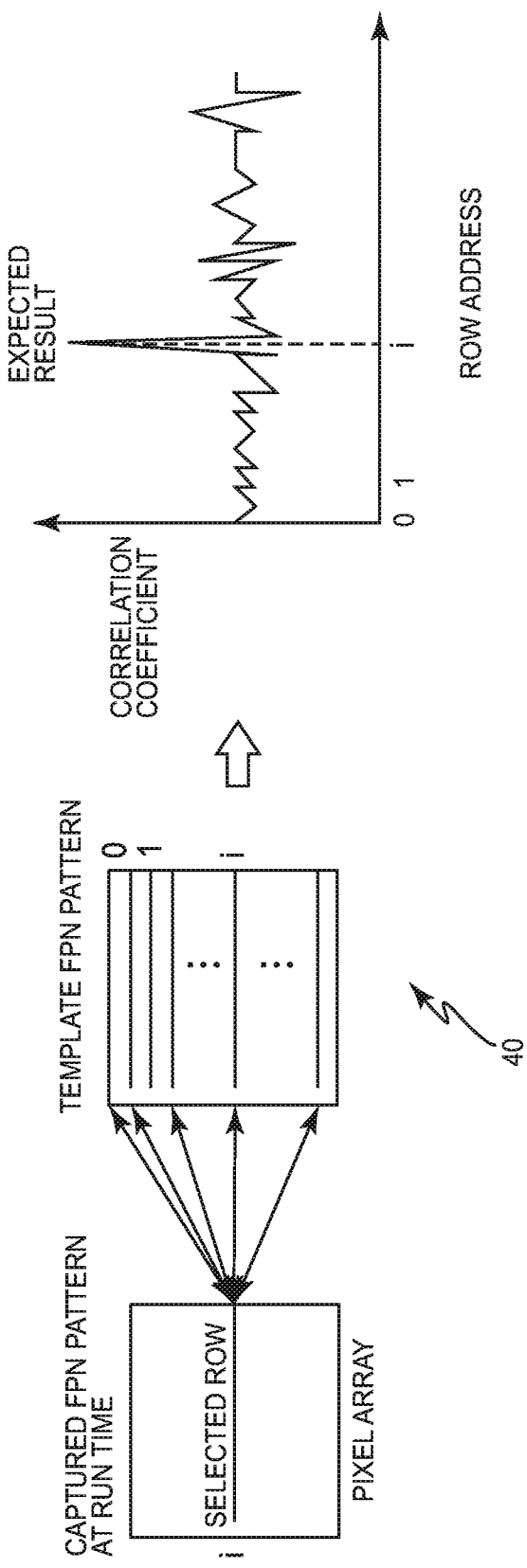
FIG. 7 is a diagram of one embodiment of a fixed noise pattern evaluation process, according to the teachings herein.

Correspondingly, FIG. 7 illustrates an example approach to using the FPN template 40 at run-time in a device or system that incorporates the sensor characterized by the FPN template 40. For example, the sensor head or camera of a machine vision system includes a CMOS image sensor for area monitoring, etc., and further includes non-volatile storage for storing the FPN template for the image sensor. The sensor head or camera further includes test circuitry for reading out pixel data from the sensor, based on inputting row/column addresses to the sensor at least for those addresses represented in the FPN template. Such circuitry may be at least partly in common with the normal addressing/interfacing circuitry used to read the sensor for normal image acquisition and processing.

The test circuitry correlates the pixel data stored in the FPN template 40 for particular addresses with the actual pixel data read from the sensor when those address values were input to the sensor. If a given read address input to the sensor is being correctly decoded by the sensor, then the actual pixel data output from the sensor should strongly correlate with the pixel data comprising the characteristic FPN stored in the FPN template 40 for that address.

For example, FIG. 7 illustrates that a particular row i in the pixel array of an imaging sensor is selected and read from the sensor. The pixel data read from the sensor for the selected row i is correlated with each row of pixel data in the FPN template 40. This can be understood as a "row-to-row" correlation process, and it is expected that the highest or strongest correlation result will be observed for the row of pixel data in the FPN template 40 corresponding to the selected row address—i.e., the row address input to the sensor for reading out the pixel data.

In other words, if the address for row i is targeted by a read command input to the sensor, then the pixel data output from the pixel array for that read operation should in the absence of an addressing error correlate most strongly with the characteristic FPN of row i, as is known from the FPN template 40.

Figure 8:
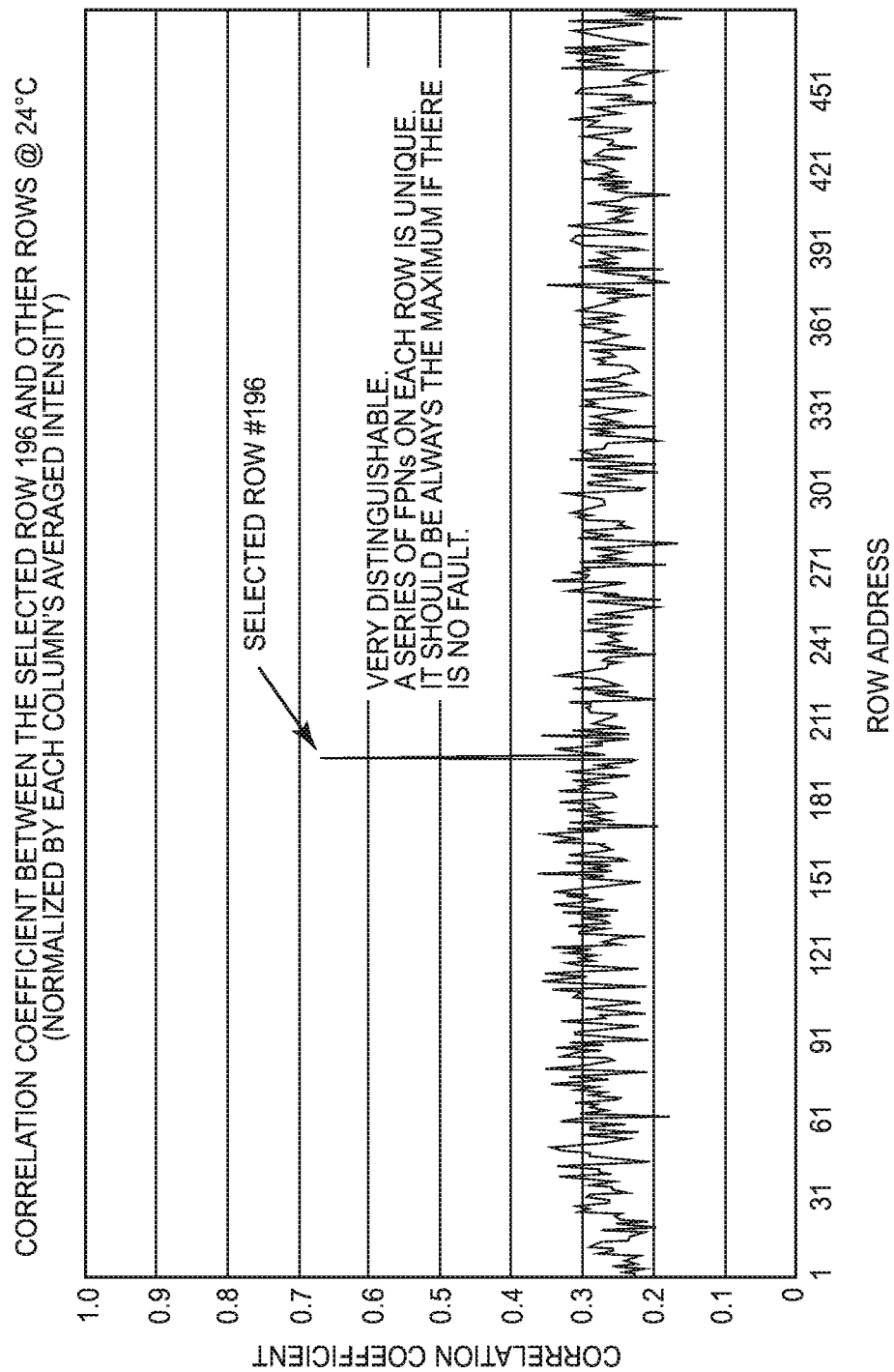
FIG. 8 is a plot of correlation processing results according to one embodiment of fixed pattern noise evaluation.

FIG. 8 provides more example details. In this case, row number 196 is ostensibly read from the sensor and the pixel data obtained from that read is correlated with each row of pixel data in the FPN template 40. This can be understood as correlating the actual FPN as read from the sensor for row address 196 with the characteristic FPN—e.g., as determined as part of factory calibration of the sensor—of each row represented in the FPN template 40. As one would expect in the absence of addressing errors in the sensor, the pixel data read out from the sensor exhibits its strongest correlation with the characteristic FPN of row 196 in the FPN template.

FIG. 9 illustrates a table summarizing certain false-positive risks associated with correlation processing and correspondingly proposed mitigation countermeasures, as contemplated in one or more embodiments. In particular, FPN is strongly dependent on sensor temperature and FPN becomes less distinct at lower temperatures—i.e., differences in the FPN between different rows or columns are less pronounced at lower sensor temperatures. One contemplated mitigation, therefore, it to use heating to ensure that the sensor is at a sufficient temperature.

Of course, in the presence of heating failures or under certain other conditions, it is still possible that insufficient FPN differences exist between different rows or columns in the sensor. Thus, another false-positive risk arises in the case where the sensor addressing failure is such that reading from a selected row or column erroneously accesses pixel data from multiple rows or columns. To mitigate this failure risk, the correlation processing may be configured to declare an error condition if it sees relatively strong correlations between multiple rows or columns in the FPN template 40 and the actual pixel data read from a selected row or column of the sensor. Such errors may result from actual addressing errors, or they may result from the FPN not being sufficiently distinct across row/columns of the sensor at cooler temperatures.

FIG. 10 illustrates empirical temperature data obtained for an example sensor in a prototype camera product. The table shows the observed relationships between outside, ambient temperatures and sensor temperatures inside the prototype camera. The data indicates that reliable address failure detection is available at external ambient temperatures as low as 0 degrees Celsius. Of course, operation at even lower external ambient temperatures may be tolerated with other camera designs and/or in dependence on further mitigations.

For example, it is also contemplated herein to use dynamic variation of analog-to-digital, ADC, resolution. The ADC resolution at issue here will be understood as being that used for reading out pixel values from the pixel array of the sensor—an ADC is shown in the example of FIG. 1. Additionally, or alternatively, dynamic gain and/or offset control are used for the sensor, as a further mitigation. As will be explained, dynamic control of gain and/or offset values associated with operating and/or reading a sensor pixel array may be used to enhance the distinctiveness of the actual FPN exhibited by the different rows/columns in the sensor.

FIG. 11 illustrates example pseudo code for performing row-wise correlation processing, for the detection of sensor addressing errors as contemplated in one or more embodiments herein. From inspection of the pseudo code, one sees that the algorithm requires that the selected row—i.e., the row read from the sensor for a particular input address—exhibit the highest correlation with the row at the same address in the FPN template.

Thus, the FPN of the read row is compared to the FPN of each row in the FPN template 40 and the test passes only if the correlation between the FPN of the read row correlates most strongly with the FPN in the FPN template 40 for the row address of the read row. Stated more generally, pixel data is read from the sensor for a particular address (or address range). Absent addressing errors, the FPN represented by the read pixel data should correlate most strongly with the FPN stored in the FPN template 40 for the same address or address range.

Additionally, the algorithm may be extended to require that the correlation results are at least as strong as a defined threshold—e.g., 0.8 on a correlation scale of 0 (no correlation) to 1 (perfect correlation). Of course, the algorithm may be adapted for column-wise processing, etc.

In other aspects of the addressing error detections contemplated herein, both run-time and power-on detection processing are considered. In one approach for run-time detection, the contemplated test circuit uses low-integration (low exposure) test frames to obtain actual FPN patterns for the sensor and uses both dark columns and/or dark rows and, in at least some embodiments, pixels in the active pixel array. This flexibility is permissible because the camera or sensor head containing the sensor generally will be hot enough during run time operations to ensure sufficiently distinct FPN between different rows and columns of the sensor.

On the other hand, the sensor may be too cool at power-on for the sensor to exhibit sufficiently distinct FPN patterns between different rows and/or columns. However, waiting for the sensor to warm up before performing address testing is not practical and, in safety-critical applications, it may be that operation of a guarded machine or other external operations are not permitted to commence until all safety-critical testing is successfully performed.

Thus, it is contemplated herein to perform address testing a power-on based on using extended exposure times, e.g., exposure times of 500 ms to a few seconds. The use of long exposure times is effective when the ambient temperature is cold or otherwise when the sensor has not reached normal operational temperatures. Moreover, for the cold/power-on address testing, the test circuit in one or more embodiments reads only the dark columns and/or dark rows of the sensor for correlation of the FPN patterns with the FPN template 40. Thus, it is contemplated in one or more embodiments herein that the FPN template 40 includes temperature-dependent FPN characteristics, for both the dark columns/rows and active columns/rows of the sensor.

The uniqueness or distinctiveness of the FPN as observed for the pixel data read from different rows/columns of the sensor is a key aspect of reliable detection of addressing errors. To that end, in some embodiments contemplated herein, the test circuit controls and changes FPN patterns of the sensor by applying known, built-in analog offsets and/or changing analog gains. In other words, by changing one or more parameters of sensor operation—broadly referred to as changing the "operating point" of the sensor—one changes the FPN patterns exhibited by the sensor.

As such, as part of factory calibration, the characteristic FPN pattern of the sensor for some or all rows/columns can be learned for each one of several different operating points. Then, during live or field testing of that sensor in situ—i.e., within the product containing that sensor—the FPN correlation processing taught herein can be performed for each of the several operating points, giving the test circuit a larger data set to more reliably detect sensor addressing errors.

One may regard this as generating a different FPN template 40 for each operating point, or it may also be regarded as having a multi-dimensional or multi-page FPN template 40. During actual in situ testing, the test circuit would select an operating point—e.g., by setting the appropriate gain and/or offset values for the sensor. While holding the selected operating point, the test circuit would read out pixel data from the sensor for selected addresses and compare that data to the FPN template 40 data for the selected operating point. Such testing would be performed at some or all of the operating points and the overall pass/fail status of the testing can be based on the aggregation of test results. In a particularly strict safety setting, the overall test may be considered as having failed if any test at any one of the operating points fails.

The table shown in FIG. 12 represents an example collection of mitigations and/or enhancements for performing FPN-based correlation processing as taught herein, for reliably detecting sensor-addressing errors. One sees that the analog offset of the analog processing circuitry 16 may be controlled to introduce a certain offset to pixel intensities of the sensor 10. Additionally, or alternatively, the FPN exhibited by the sensor 10 may be altered or may be made more distinct on a per row/column basis by controlling analog gain, e.g., by increasing the analog gain of the analog processing circuitry 16 seen in FIG. 1. Further, additionally, or alternatively, the contemplated test circuit may dynamically adjust the resolution and/or reference voltage of the ADC 18 used to digitize pixel values from the sensor 10, as a mechanism to enhance the distinctiveness between the actual FPN exhibited by different rows/columns of the sensor.

Figure 13:
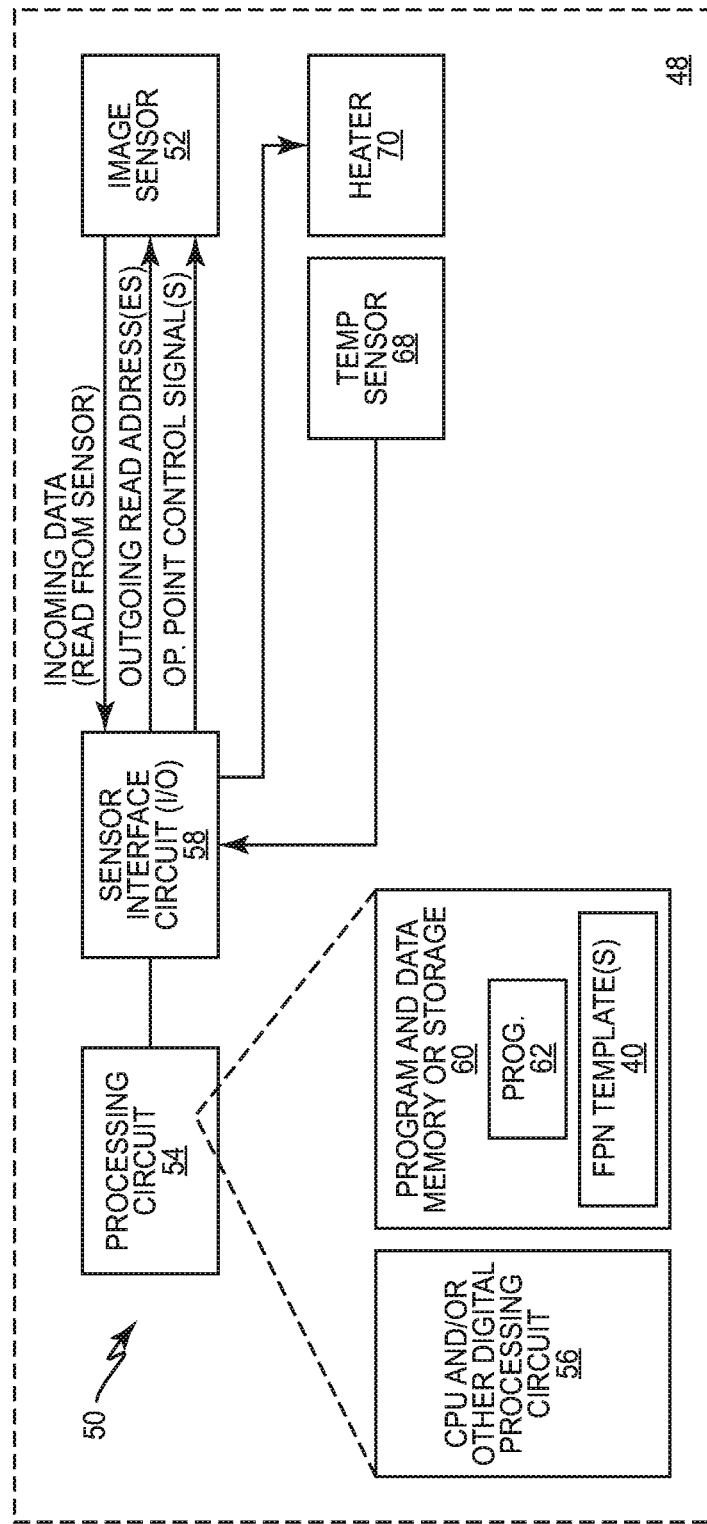
FIG. 13 is a block diagram of an imaging apparatus that includes an image sensor, and further includes a test circuit configured according to one embodiment disclosed herein, for testing the image sensor.

FIG. 13 illustrates a contemplated test circuit 50 according to an example embodiment. The test circuit 50 resides in, for example, an imaging apparatus 48, which may be a camera or other device or assembly. It will be understood that all or at least a portion of the test circuit 50 may be shared with the imaging apparatus 48. For example, in some embodiments, the test circuit 50 is implemented in or otherwise integrated with the overall image processing and control circuitry that is necessarily implemented in the imaging apparatus 48, for integrating and using an image sensor 52, which may be a CMOS image sensor.

The test circuit 50 includes a processing circuit 54, which includes a CPU or other digital processing circuitry 56. The processing circuit 54 comprises, for example, one or more microprocessors, microcontrollers, DSPs, FPGAs or other programmable logic device, ASICs, etc., along with supporting circuitry. For example, the processing circuit 54 includes or is associated with program and data memory or storage 60. The program and data memory or storage 60 comprises, for example, FLASH, EEPROM or other non-volatile memory. Of course, the processing circuit 54 may include or be associated with volatile, working memory, such as SRAM.

Broadly, the program and data memory or storage 60 comprises a computer-readable medium that in one or more embodiments provides non-volatile, non-transitory storage for a computer program 62 and one or more FPN template(s) 40. In a particular example, the program and data memory or storage 60 stores at least one FPN template 40 that comprises characteristic FPN data for the image sensor 52.

By way of further example, the test circuit 50 includes a sensor interface circuit 58, I/O circuitry, that couples the processing circuit 54 to the image sensor 52. The processing circuit 54 outputs, for example, outgoing read addresses to the image sensor 52 and receives incoming pixel data as read from the sensor 52 for those read addresses. The processing circuit 54 further outputs data or signals representing operating point, OP, control signaling. The OP control signaling controls the ADC resolution, the gain, and/or the offset values used to establish the operating point(s) of the image sensor 52, for purposes of sensor-addressing testing.

While the processing circuit 54 may comprise fixed circuitry in one or more embodiments, it also contemplated herein to implement the test circuitry 54 using programmable circuitry—e.g., a microprocessor. In such embodiments, the programmable circuitry is specially adapted to carry out the operations disclosed herein, based on its execution of the computer program instructions comprising the computer program 62, as stored in the program and data memory or storage 60.

The test circuit 50 also may include or be associated with a temperature sensor 68 and/or a heater 70. In one contemplated embodiment, the FPN template(s) 40 comprise more than one FPN template 40, where each such FPN template 40 is associated with a different temperature range. In turn, the processing circuit 54 obtains temperature readings—e.g., ambient temperature measurements—from the temperature sensor 68 via the I/O circuitry 58, and it selects the appropriate FPN template 40 to use for detecting addressing errors. Additionally, or alternatively, there is only one FPN template 40, but it includes temperature-dependent subsections or portions, and the processing circuit 54 uses the detected temperature to access the appropriate portion of subsection of the FPN template 40.

As a further addition or in one or more further embodiments, the processing circuit 54 controls a heater 70—e.g., an electric coil, power resistor, or other heating circuit—to prevent the image sensor 52 from becoming so cold that its actual row/column FPNs become indistinct. For example, the processing circuit 54 may activate the heater 70 as needed to keep the image sensor 52 at or above a minimum temperature value.

In general, according to an embodiment contemplated herein, the test circuit 50 configured to detect addressing errors in an image sensor 52, and it includes the processing circuit 54, the computer-readable medium 60 storing a fixed pattern noise, FPN, template 40 that comprises reference FPN values for at least a range of pixel addresses of the sensor 52. Further, the test circuit 50 includes a sensor interface circuit 58 configured to communicatively couple the processing circuit 54 to the image sensor 52.

The processing circuit 54 is configured to obtain actual fixed pattern noise for targeted pixel addresses of the image sensor 52, and to correlate the actual fixed pattern noise with reference fixed pattern noise known for the targeted pixel addresses. Further, the processing circuit 52 is configured to detect an addressing fault for the image sensor based on the correlation results.

For example, in at least one such embodiment, the processing circuit 54 is configured to obtain the actual fixed pattern noise for targeted pixel addresses of the image sensor by obtaining actual fixed pattern noise for a targeted row or column of the pixel array, and to correlate the actual fixed pattern noise with the reference fixed pattern noise by obtaining the reference fixed pattern noise for a range of rows or columns of the pixel array. This range includes the targeted row or column.

The processing circuit 54 is configured to correlate the actual fixed pattern noise for the targeted row or column with the reference fixed pattern noise for each row or column in the range. Further, the processing circuit 54 is configured to detect the addressing fault for the image sensor based on the correlation results by deciding that that there is an addressing fault if the actual fixed pattern noise for the targeted row or column does not "unambiguously" correlate with the reference fixed pattern noise for the targeted row or column.

In general, "unambiguous" correlation means a correlation result that is above a defined correlation threshold. It may further mean that the actual fixed pattern noise for the targeted pixel addresses does not demonstrate a strong correlation result with any reference fixed pattern noise in the FPN template 40 except for the reference fixed pattern noise corresponding to the targeted pixel addresses. Still further, it may mean that the correlation result seen between the actual fixed pattern noise and the reference fixed pattern noise corresponding to the targeted pixel addresses exceed all other correlation results by a defined margin.

For example, while the actual fixed pattern noise read from the sensor 52 for a targeted row or column may produce a strong correlation result with respect to the reference fixed pattern noise contained in the FPN template 40 for the targeted row or column, it may also strongly correlate with other row or column data in the FPN template 40. Such ambiguity arises, for example, at lower sensor temperatures where the actual fixed pattern noise of the sensor 52 may become less distinct across rows or columns of the sensor 52.

Further, regardless of the particular architecture of the test circuit 50, in one or more embodiments herein, a test circuit 50 is configured to perform a method of detecting erroneous pixel addressing in an image sensor comprising a pixel array. The method includes obtaining actual fixed pattern noise for targeted pixel addresses of the image sensor, correlating the actual fixed pattern noise with reference fixed pattern noise known for the targeted pixel addresses, and detecting an addressing fault for the image sensor based on the correlation results.

The method is performed at startup of the device or apparatus that contains the image sensor 52 being tested, and the method may include using extended exposure times for reading the actual fixed pattern noise from the sensor 52. Additionally, or alternatively, the method is performed at run-time and further comprises using nominal exposures corresponding to an operational frame rate.

In some embodiments, the method includes heating the sensor 52 according to a desired minimum operating temperature, and one or more embodiments of the method include storing factory characterization information comprising temperature-dependent reference fixed pattern noise data for at least a range of pixel addresses of the sensor. That is, the FPN template 40 includes temperature-dependent characterization data. For example, the FPN template 40 stores factory characterization information comprising temperature-dependent reference fixed pattern noise data for all pixel addresses of the sensor 52.

In further example details for the contemplated method, the step of obtaining the actual fixed pattern noise for targeted pixel addresses of the image sensor comprises obtaining actual fixed pattern noise for a targeted row or column of the pixel array. The step of correlating the actual fixed pattern noise with the reference fixed pattern noise comprises obtaining the reference fixed pattern noise for a range of rows or columns of the pixel array, where the range includes the targeted row or column, and correlating the actual fixed pattern noise for the targeted row or column with the reference fixed pattern noise for each row or column in the range. The step of detecting an addressing fault for the image sensor 52 based on the correlation results comprises deciding that that there is an addressing fault if the actual fixed pattern noise for the targeted row or column does not unambiguously correlate with the reference fixed pattern noise for the targeted row or column.

Figure 14:
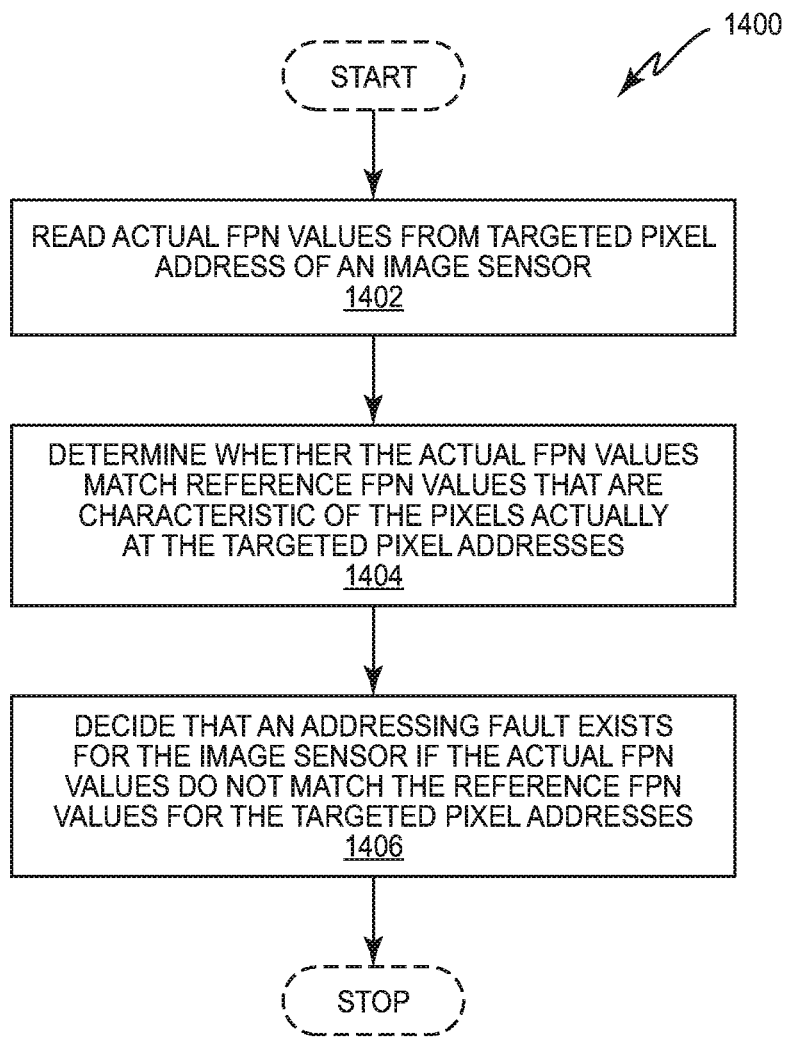
FIG. 14 is a logic flow diagram of one embodiment of a method of image sensor testing disclosed herein.

FIG. 14 provides a flow diagram for an example method 1400, which may be understood as an implementation of the above-described processing. It will be appreciated that one or more steps of the method 1400 may be performed in an order other than suggested by the illustration and that one or more steps may be performed in parallel, in conjunction with other operations, and may be repeated or looped.

For example, in some embodiments, the method 1400 is performed at power-on of the imaging apparatus 48, for any one or more operating points of the image sensor 14, and is performed on a repeating and/or triggered basis during normal run-time operations of the imaging apparatus 48. In at least one embodiment, safety-critical failure detection requirements dictate the frequency at which the method 1400 is executed.

In any case, the method 1400 includes reading (Block 1402) actual fixed pattern noise, FPN, values from targeted pixel addresses of the image sensor 52, and determining (Block 1404) whether the actual FPN values match reference FPN values that are characteristic of the pixels actually at the targeted pixel addresses. The method 1400 further includes deciding (Block 1406) that an addressing fault exists for the image sensor if the actual FPN values do not match the reference FPN values for the targeted pixel addresses.

In an example of the test circuit 50 implementing the method 1400, the test circuit 50 is configured to read actual fixed pattern noise, FPN, values from targeted pixel addresses of the image sensor 52 and determine whether the actual FPN values match the reference FPN values known from the FPN template for the pixels actually at the targeted pixel addresses. The test circuit 50 is further configured to decide that an addressing fault exists for the image sensor 52 if the actual FPN values do not match the reference FPN values for the targeted pixel addresses.

As previously noted, it will be understood that the "matching" stipulated for the method 1400 may be more sophisticated or nuanced that a simple match/no-match evaluation. For example, the actual FPN values as read from the sensor 52 may comprise a targeted row or column of pixels in the pixel array of the sensor and the method 1400 may require unambiguous matching, as defined by any one of or any combination of:

correlating the actual FPN values against the reference FPN values for multiple rows or columns in the FPN template 24 and ensuring that the largest correlation response is seen with respect to the reference FPN values corresponding to the targeted row or column;

ensuring that the correlation response between the actual FPN values and the reference FPN values for the targeted row or column is at or above some defined minimum response threshold;

ensuring that the correlation response seen between the actual FPN values and the reference FPN values for the targeted row or column is greater in magnitude by some defined margin than the correlation responses seen with respect to all other rows or columns evaluated in the FPN template 40; and ensuring that there are not multiple rows or columns from the FPN template 40 that produce a strong correlation response with respect to the actual FPN values read from the image sensor 52.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of detecting erroneous pixel addressing in an image sensor comprising a pixel array, said method comprising:
   obtaining actual fixed pattern noise for targeted pixel addresses of the image sensor;
   correlating the actual fixed pattern noise with reference fixed pattern noise known for the targeted pixel addresses; and
   detecting an addressing fault for the image sensor based on the correlation results.

2. The method of claim 1, wherein the method is performed at startup and further comprises using extended exposure times.

3. The method of claim 1, wherein the method is performed at run-time and further comprises using nominal exposures corresponding to an operational frame rate.

4. The method of claim 1, further comprising heating the sensor according to a desired minimum operating temperature.

5. The method of claim 1, further comprising storing factory characterization information comprising temperature-dependent reference fixed pattern noise data for at least a range of pixel addresses of the sensor.

6. The method of claim 1, further comprising storing factory characterization information comprising temperature-dependent reference fixed pattern noise data for all pixel addresses of the sensor.

7. The method of claim 1, wherein obtaining the actual fixed pattern noise for targeted pixel addresses of the image sensor comprises obtaining actual fixed pattern noise for a targeted row or column of the pixel array, wherein correlating the actual fixed pattern noise with the reference fixed pattern noise comprises obtaining the reference fixed pattern noise for a range of rows or columns of the pixel array, said range including the targeted row or column, and correlating the actual fixed pattern noise for the targeted row or column with the reference fixed pattern noise for each row or column in said range, and wherein detecting the addressing fault for the image sensor based on the correlation results comprises deciding that that there is an addressing fault if the actual fixed pattern noise for the targeted row or column does not unambiguously correlate with the reference fixed pattern noise for the targeted row or column.

8. The method of claim 1, wherein:
   obtaining the actual fixed pattern noise for targeted pixel addresses of the image sensor comprises reading actual fixed pattern noise, FPN, values from targeted pixel addresses of the image sensor;
   correlating the actual fixed pattern noise with the reference fixed pattern noise known for the targeted pixel addresses comprises determining whether the actual FPN values match reference FPN values that are characteristic of the pixels actually at the targeted pixel addresses; and
   detecting an addressing fault for the image sensor based on the correlation results comprises deciding that an addressing fault exists for the image sensor if the actual FPN values do not match the reference FPN values for the targeted pixel addresses.

9. A test circuit configured to detect addressing errors in an image sensor, said test circuit comprising:
   a processing circuit;
   a computer-readable medium storing a fixed pattern noise, FPN, template that comprises reference FPN values for at least a range of pixel addresses of the sensor; and
   a sensor interface circuit configured to communicatively couple the processing circuit to the image sensor; and
   wherein the processing circuit is configured to:
     obtain actual fixed pattern noise for targeted pixel addresses of the image sensor;
     correlate the actual fixed pattern noise with reference fixed pattern noise known for the targeted pixel addresses; and
     detect an addressing fault for the image sensor based on the correlation results.

10. The test circuit of claim 9, wherein the processing circuit is configured to:
    obtain the actual fixed pattern noise for targeted pixel addresses of the image sensor by obtaining actual fixed pattern noise for a targeted row or column of the pixel array;
    correlate the actual fixed pattern noise with the reference fixed pattern noise by obtaining the reference fixed pattern noise for a range of rows or columns of the pixel array, said range including the targeted row or column, and correlating the actual fixed pattern noise for the targeted row or column with the reference fixed pattern noise for each row or column in said range; and detect the addressing fault for the image sensor based on the correlation results by deciding that that there is an addressing fault if the actual fixed pattern noise for the targeted row or column does not unambiguously correlate with the reference fixed pattern noise for the targeted row or column.

11. The test circuit of claim 9, wherein the processing circuit is configured to:

read actual fixed pattern noise, FPN, values from targeted pixel addresses of the image sensor;

determine whether the actual FPN values match the reference FPN values known from the FPN template for the pixels actually at the targeted pixel addresses; and decide that an addressing fault exists for the image sensor if the actual FPN values do not match the reference FPN values for the targeted pixel addresses.

\* \* \* \* \*